United States Patent [19]

Eisenbraun et al.

[11] 4,038,344

[45] July 26, 1977

[54] GRAFT COPOLYMERS OF OLEFINIC NITRILES AND OLEFINIC ESTERS ON DIENE RUBBERS

[75] Inventors: Allan A. Eisenbraun; Edwin D. Hornbaker, both of Baton Rouge, La.

[73] Assignee: Ethyl Corporation, Richmond, Va.

[21] Appl. No.: 176,715

[22] Filed: Aug. 31, 1971

Related U.S. Application Data

[63] Continuation-in-part of Ser. No. 100,358, Dec. 21, 1970, abandoned.

[51] Int. Cl.² .......................................... C08F 293/00
[52] U.S. Cl. .................................................... 260/879
[58] Field of Search .......................................... 260/879

[56] References Cited

U.S. PATENT DOCUMENTS

| 3,549,725 | 12/1970 | Rose et al. | 260/876 |
| 3,586,737 | 6/1971 | Duke et al. | 260/879 |

Primary Examiner—William F. Hamrock
Attorney, Agent, or Firm—Donald L. Johnson; Jack F. Sieberth; David L. Ray

[57] ABSTRACT

Impact resistant polymers having low permeability to gases and vapors are prepared by polymerizing an olefinic nitrile such as acrylonitrile with an olefinic ester such as methyl acrylate in an aqueous medium in the presence of a diene rubber.

16 Claims, No Drawings

GRAFT COPOLYMERS OF OLEFINIC NITRILES AND OLEFINIC ESTERS ON DIENE RUBBERS

BACKGROUND OF THE INVENTION

The present application is a continuation-in-part of U.S. application Ser. No. 100,358, filed Dec. 21, 1970, now abandoned.

The present invention relates to novel polymeric compositions which have low permeability to gases and more particularly pertains to strong, impact resistant compositions which function as gas and vapor barrier materials and are composed of a conjugated diene monomer, an olefinically unsaturated nitrile, and an ester of an olefinically unsaturated carboxylic acid, and to a process for preparing same.

U.S. Pat. No. 3,426,102, issued Feb. 4, 1969, discloses an impact resistant polymer having low permeability to gases and vapors. The polymers of this patent are prepared by polymerizing a major portion of olefinically unsaturated nitrile such as acrylonitrile and a minor portion of an ester of an olefinically unsaturated carboxylic acid such as ethyl acrylate in the presence of a preformed rubbery copolymer composed of a major portion of a conjugated diene monomer such as butadiene and a minor portion of olefinically unsaturated nitrile such as acrylonitrile. The prior art differs from the present invention in that the substrate on which the grafting reaction is performed is a rubbery copolymer of diene and an olefinically unsaturated nitrile such as acrylonitrile, whereas in our invention the rubbery material is a homopolymer of a diene such as butadiene or isoprene. An advantage of the present invention over the prior art is that polybutadiene is generally lower in cost than a copolymer of acrylonitrile and butadiene.

German patent specification No. 1,957,324 discloses impact resistant polymers with low permeability to gases and vapors. The polymers are composed of a conjugated diene, an olefinic unsaturated nitrile, an olefinically unsaturated carboxylic acid ester, and optionally, a vinyl aromatic compound. The polymers are prepared by polymerizing a mixture consisting of 100 parts of an olefinically unsaturated nitrile as the major portion and an olefinically unsaturated carboxylic acid ester as the minor portion in the presence of 20–50 parts of a preformed diene homopolymer or 20–50 parts of preformed copolymer of a diene and a vinyl aromatic compound. The present invention differs from the prior art in that 100 parts of a mixture consisting of an olefinically unsaturated nitrile as the major component and an olefinically unsaturated carboxylic acid ester as a minor component is polymerized in the presence of 4–18 parts of a preformed diene homopolymer.

The novel polymeric products of the present invention are thermoplastic materials exhibiting the following desirable properties: Excellent melt strength, excellent tensile strength, high tensile modulus, good impact strength, excellent barrier properties toward gases and vapors, almost no discoloration, and transparency with very low haze levels. These novel polymeric products are useful in a great number of applications such as in the manufacture of articles for personal and industrial use, e.g., buttons, toys, motor housings, etc. They are particularly useful as containers for food, beverages, chemicals, etc., since their low permeability toward oxygen and carbon dioxide will prevent deterioration of the product in the container through oxidation by atmospheric oxygen and at the same time will keep desirable ingredients, such as carbon dioxide in carbonated beverages from escaping from the packaged product by diffusion through the container wall.

THE INVENTION

The novel polymeric products of the present invention are prepared by polymerizing 100 parts of a mixture consisting of a major portion of olefinically unsaturated nitrile such as acrylonitrile and a minor portion of an ester of an olefinically unsaturated carboxylic acid such as methyl acrylate or methyl methacrylate in the presence of 4–18 parts of a preformed diene polymer such as polybutadiene or polyisoprene.

The conjugated diene monomers useful in the present invention include butadiene-1,3; isoprene; cyanoprene; 2,3-dimethyl-butadiene-1,3; 2-ethyl-butadiene-1,3; 2,3-diethylbutadiene-1,3, and the like. In the preferred embodiment of the present invention the conjugated diene monomers are butadiene and isoprene. The most preferred is butadiene.

The olefinically unsaturated nitriles useful in the present invention are the alpha, beta-olefinically unsaturated mononitriles having the structure

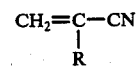

wherein R is hydrogen or a lower alkyl group having from 1 to 4 carbon atoms. Such compounds include acrylonitrile, methacrylonitrile, ethacrylonitrile, and the like. The most preferred olefinically unsaturated nitriles in the present invention are acrylonitrile and methacrylonitrile, and mixtures thereof.

The esters of olefinically unsaturated carboxylic acids useful in the present invention are preferably the lower alkyl esters of alpha, beta-olefinically unsaturated carboxylic acids and more preferred are the esters having the structure

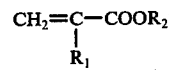

wherein $R_1$ is hydrogen, or an alkyl group having from 1 to 4 carbon atoms, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates, and the hexyl methacrylates. Most preferred in the present invention are methyl acrylate, ethyl acrylate, and methyl methacrylate.

The polymeric compositions of the present invention can be prepared by any of the known general techniques of polymerization including the bulk polymerization, solution polymerization, and emulsion or suspension polymerization techniques by batch, continuous or intermittent addition of the monomers and other components. The preferred method is emulsion polymerization. The important point in the novel process of this invention is that the novel polymeric products are prepared by polymerizing 100 parts of a mixture consisting of the olefinically unsaturated nitrile and the ester of the olefinically unsaturated carboxylic acid in the present of 4–18 parts of a preformed diene polymer such as polybutadiene or polyisoprene. Polymerization is preferably carried out in aqueous medium in the presence of an emulsifier and a free radical generating polymerization initiator at a temperature of from about 0° to 100° C in a substantial absence of molecular oxygen. The simultaneous interpolymerization of a mixture of the conjugated diene monomer, the olefinically unsaturated nitrile and the ester of an olefinically unsaturated carboxylic acid does not produce polymeric products which resemble the polymeric products resulting from the instant process. Moreover, the physical blending of a homopolymer of the conjugated diene monomer with a copolymer of the olefinically unsaturated nitrile and an ester of an olefinically unsaturated carboxylic acid does not produce polymeric products which resemble in physical properties the polymeric products of the instant process.

The polymeric compositions embodied herein are those resulting from the polymerization of 100 parts by weight of A. at least 50 percent by weight of at least one nitrile having the structure

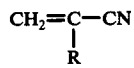

where R is hydrogen or an alkyl group with 1 to 4 carbon atoms,

B. up to 50 percent by weight based on the combined weight of (A) and (B) of an ester having the structure

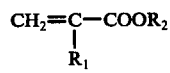

where $R_1$ is hydrogen or an alkyl group with 1 to 4 carbon atoms, and $R_2$ is an alkyl group containing from 1 to 6 carbon atoms, in the presence of from 4 to 18 parts by weight of C. a homopolymer of a conjugated diene monomer selected from the group consisting of butadiene and isoprene.

The preferred polymeric compositions embodied herein are those resulting from the polymerization of 100 parts by weight of A. at least 60 percent by weight of at least one nitrile having the structure

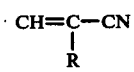

where R is hydrogen or an alkyl group with 1 to 4 carbon atoms,

B. up to 40 percent by weight based on the combined weight of (A) and (B) of an ester having the structure

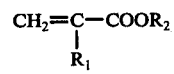

where $R_1$ is hydrogen or an alkyl group with 1 to 4 carbon atoms, and $R_2$ is an alkyl group containing from 1 to 6 carbon atoms, in the presence of from 8 to 15 parts by weight of C. a homopolymer of a conjugated diene monomer selected from the group consisting of butadiene and isoprene.

The most preferred polymeric compositions embodied herein are those resulting from the polymerization of 100 parts by weight of A. at least 60 percent acrylonitrile, B. up to 40 percent by weight based on the combined weight of (A) and (B) of an ester having the structure

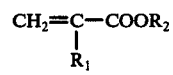

where $R_1$ is hydrogen or an alkyl group with 1 to 4 carbon atoms, and $R_2$ is an alkyl group containing from 1 to 6 carbon atoms, in the presence of from 9 to 12 parts by weight of polybutadiene.

More specifically, the present invention can be illustrated in the polymerization of a mixture of acrylonitrile and methyl acrylate in the presence of a preformed copolymer of butadiene-1,3 to produce a product having excellent impact strength and exceptionally good impermeability to gases and vapors when exposed to said gases and vapors in the form of a thin sheet. Preferably, the acrylonitrile-methyl acrylate monomer feed should contain at least 50 percent by weight of acrylonitrile based on the combined weights of acrylonitrile and methyl acrylate and, more preferably, the acrylonitrile fed to the polymerization reaction should be in the order of from 60 to 90 percent by weight based on the combined weight of all of the acrylonitrile and methyl acrylate used in the polymerization.

The rubbery homopolymer of butadiene-1,3 should be in the form of an emulsion but it could also be utilized in other forms such as in suspension or in solution.

It has unexpectedly been found that a tough polymeric composition of vastly superior clarity and tensile strength over that disclosed in German patent specification No. 1,957,324 is obtained when the polymerization is carried out in the presence of 4 to 18 and preferably 8 to 15 parts of a preformed homopolymer of butadiene or isoprene for each 100 parts of nitrile monomer, acrylic or methacrylic ester. When substantially more than 15 parts of preformed homopolymer of butadiene or isoprene per 100 parts of nitrile monomer is used the resultant polymer, while having good barrier properties, has poor tensile strength and generally suffers from an excessive amount of haze. A polymerization in the higher amounts of elastomer homopolymer is described in German patent specification No. 1,957,324.

Polymerizations carried out in the presence of a smaller amount of preformed homopolymer of butadiene or isoprene than described by the present invention, or in the absence of any preformed homopolymer, resulted in products with excellent tensile properties but poor impact resistance. This poor impact resistance is a serious limitation in a number of applications. Good impact strength is generally required of most plastics and is responsible for the replacement of glass by plastics in a great number of applications such as in bottles, jars, etc.

The novel polymeric products of the present invention are thermoplastic materials which can be formed into a wide variety of useful articles in any of the conventional ways employed with known thermoplastic polymeric materials, such as by extrusion, milling, molding, drawing, blowing, etc. The polymeric products of this invention have excellent solvent resistance and their high tensile strength combined with good impact strength and low permeability to gases and vapors make them very useful in the packaging industry and they are particularly useful in the manufacture of bottles, jars, films and other types of containers for liquids and solids.

EXAMPLE I

A solution consisting of 308.6 grams acrylonitrile, 101.3 grams methyl acrylate, and 8.0 grams of n-dodecylthiol was added to an emulsion consisting of a solution of 5 grams of sodium laurylsulfate, 1.0 grams of monosodium phosphate monohydrate and 0.2 grams of ethylenediaminetetraacetic acid disodium salt in 1450 grams of water and 100 grams of FRS-2004 (a 60 percent aqueous polybutadiene latex manufactured by Firestone Corp.). The mixture was mechanically stirred in a nitrogen atmosphere while heating at 58° C. Polymerization was initiated by the addition of a solution of 0.4 grams of potassium persulfate in 30 ml water and allowed to continue over a period of 6.1 hours. The reaction mixture was cooled and strained through a 50 mesh screen to separate the polymer latex from a small amount of by-products. The latex was coagulated by adding to it a hot 1.0 percent aqueous solution of calcium chloride. A part of the unreacted monomers was vaporized at this point. The coagulated product was washed with water until free of calcium chloride, then dried at 55° C and ground to a powder. The dry product weighed 376.9 grams, contained 63.3 percent acrylonitrile, and had an inherent viscosity of 0.92 in dimethylformamide at 25° C and a concentration of 0.5 grams per 100 milliliters of solution. About 50 grams of the product was fused by mixing in a Brabender Plastograph for 4 minutes at 165°-187° C. The fused product showed excellent melt strength and was molded at 172° C to form a 6 inch × 3 inch × ⅛ inch almost colorless, transparent plate only slightly hazy in reflected light and practically haze-free in transmitted light and had the following physical properties:

| | |
|---|---|
| Tensile yield | 8450 psi |
| Elongation at break | 10% |
| Tensile modulus | 558,000 psi |
| Notched Izod impact | 2.6 ft/lbs per in. of notch |
| Deflection temp. at 264 psi | 65.0° C |

EXAMPLE II

A solution consisting of 299.3 grams of acrylonitrile, 100.0 grams methyl acrylate and 12.1 grams n-dodecylthiol was added to an emulsion consisting of a solution of a 5 grams of sodium laurylsulfate, 0.82 grams monosodium phosphate monohydrate, and 0.2 grams of ethylenediaminetetraacetic acid disodium salt in 1,430 grams of water, and 82 grams of FRS-2004 (a 60% aqueous polybutadiene latex manufactured by Firestone Corp.). The mixture was mechanically stirred in a nitrogen atmosphere. A solution of 3.0 grams of sodium laurylsulfate and 30 milliliters of water was added. The reaction mixture was heated to 59° C. Polymerization was initiated by the addition of 0.4 grams potassium persulfate and allowed to proceed for 7.8 hours. The reaction mixture was cooled and strained through a 50 mesh screen to separate the polymer latex from a small amount of by-product. The latex was coagulated by adding to it a hot 1.0 percent aqueous solution of calcium chloride. Most of the unreacted monomer was vaporized at this point. The coagulated product was washed with water until all calcium chloride was removed therefrom, then dried at 55° C and ground to a powder. The dry product weighed 415.5 grams and contained 63.2 percent of bound acrylonitrile. The product had an inherent viscosity of 0.82 in dimethylformamide at 25° C at a concentration of 0.5 grams per 100 milliliter solution. About 50 grams of the product was fused by mixing in a Brabender Plastograph at 156°-167° C for 2 minutes. The product showed excellent melt strength. It was then molded at 172° C to form an almost colorless, transparent 6 inch × 3 inch × ⅛ inch plate with only a trace of haze. Physical properties were as follows:

| | |
|---|---|
| Tensile yield | 8020 psi |
| Elongation at break | 10% |
| Elastic modulus | 518,000 psi |
| Notched Izod impact | 1.0 ft/lbs per in. of notch |
| Deflection temp. at 264 psi | 66.0° C |

Sheets molded from the unfused product had water vapor transmission and oxygen transmission properties similar to those of U.S. Pat. No. 3,426,102.

EXAMPLE III

In a stainless steel jacketed autoclave with a capacity of 15 gals. were placed 32 liters of water. The autoclave was equipped with a mechanical stirrer, various addition tubes, manometers and accurate temperature controls capable of holding the contents of the autoclave at a desired temperature by regulating the flow of steam and cooling water through the jacket. A solution of 125 grams of sodium laurylsulfate, 5 grams of disodium (ethylenedinitrilo) tetra acetate dihydrate and 31.0 grams of monosodium phosphate monohydrate in 3 liters of water was added to the autoclave. Mechanical agitation was started and 1,050 grams of FRS-2004 (a 60 percent aqueous polybutadiene latex manufactured by Firestone Corp.) was added slowly over a period of 30 minutes. Air in the autoclave was removed by evacuation to an absolute pressure of 2 inches mercury, pressurizing with nitrogen, and repeating the evacuation. The autoclave was again evacuated to an absolute pressure of 2 inches mercury, the mixture in the reactor heated to 59° C and a solution consisting of 360 ml of n-dodecylthiol, 7.5 kg of acrylonitrile and 2.5 kg of methyl acrylate was added, followed by the addition of a solution of 75 grams of sodium laurylsulfate in 1500 ml water. Polymerization was started by the addition of 8 grams of potassium persulfate in 400 ml water and allowed to proceed for 5-¼ hours while keeping the reaction mixture at 59° C. Unreacted monomers were then removed by distillation at a temperature of 67° C and reduced pressure for 2 hours. The resultant latex was coagulated by slow addition, with vigorous agitation, of a 1.0 percent aqueous calcium chloride solution at 65° C. The product was separated by centrifuging, washed with water and dried for 2-½ hours in a fluidized bed drier at a temperature of 60° C. The product contained 66.0 percent acrylonitrile and had an inherent viscosity of 0.65 in dimethylformamide at 25° C and a concentration of 0.5 grams per 100 ml of solution. About 50 grams of the product was fused by mixing in a Brabender Plastograph for 3 minutes at 161°-184° C. The product showed excellent melt strength. It was molded at 177° C to form an almost colorless, transparent 6 inch × 3 inch × ⅛ inch plate which exhibited only little haze. The product was stiff and strong. The notched Izod impact was 0.6 ft/lbs per inch of notch and the tensile impact was 24 ft/lbs per square inch.

EXAMPLE IV

A solution consisting of 301.0 grams acrylonitrile, 99.8 grams methyl acrylate and 12 grams n-dodecylthiol was added to an emulsion consisting of 60 grams of FRS-2004 (a 60 percent aqueous polybutadiene latex manufactured by Firestone Corp.) dispersed in a solution of 8.0 grams sodium laurylsulfate, 0.6 grams of monosodium phosphate monohydrate and 0.2 grams of disodium (ethylenedinitrilo) tetra acetate dihydrate in 1,450 grams water. The mixture was mechanically stirred in a nitrogen atmosphere while heating to 59° C. Polymerization was initiated by the addition of a solution of 0.4 grams potassium persulfate in 30 ml water and was allowed to proceed for 5 hours at 59° C. The unreacted monomers were removed by evaporation at reduced pressure. The product was precipitated in the form of small particles by adding the latex to 3 liters of 1.0 percent aqueous sodium chloride solution. Addition of 30 grams calcium chloride to the hot mixture resulted in a flocculent precipitate. The precipitate was removed by filtration, washed with water until free of chloride ions, then dried at 60° C overnight. It contained 68.4 weight percent acrylonitrile and had an inherent viscosity of 0.66 in dimethylformamide at 25° C and a concentration of 0.5 grams per 100 ml of solution. About 50 grams of the product was fused by mixing in a Brabender Plastograph for 2-½ minutes at 156°-169° C. The product showed excellent melt strength. It was molded at 188° C to a transparent, haze-free 6 inch × 3 inch × ⅛ inch plate. Physical properties were as follows:

| | |
|---|---|
| Tensile yield | 9780 psi |
| Elongation at break | 25% |
| Tensile modulus | 691,000 psi |
| Notched Izod impact | 0.72 ft/lbs per in. of notch |
| Deflection temp. at 264 psi | 68.5° C |

EXAMPLE V

The product of Example IV was milled to a sheet at a temperature of 165° C. The sheet was chopped into pellets about ⅛ inch in diameter, and the pellets were used to blow mold 16 oz. bottles. The bottles were transparent and of adequate stiffness for filling with liquids. They did not break when hit with a hard object. The bottles were substantially impermeable to a wide variety of gases and vapors.

EXAMPLE VI

In a stainless steel 15 gal. autoclave, as described in Example III, were placed 33 liters of water, followed by a solution of 5 grams of disodium (ethylenedinitrilo) tetra acetate dihydrate, 4 grams of monosodium phosphate monohydrate, and 11 grams disodium phosphate in 3 liters of water. Agitation was started and the air removed as outlined in Example III. Added were 6.0 kg of acrylonitrile, 2.0 kg methyl acrylate and a solution of 75 grams sodium laurylsulfate in 1,500 ml of water. The reaction mixture was heated to 60° C and a solution of 8.0 grams potassium persulfate in 200 ml water was added. After 10 minutes a slight increase in reaction mixture temperature was noted and a solution consisting of 1.50 kg acrylonitrile, 0.50 kg methyl acrylate and 360 ml of n-dodecylthiol was added. The polymerization was allowed to proceed at 60° C for 3-½ hours and then the reaction mixture stripped under vacuum for 3-½ hours at 63°-68° C to remove unreacted monomer. The resulting latex was coagulated by adding to 25 gals. of 1.0 percent aqueous calcium chloride soluton and keeping the solution at 70° C throughout the coagulation step. The coagulated product was washed well with water and then dried in a fluidized bed drier with hot air until volatile content was below 0.5 percent. The dried product contained about 18.6 percent nitrogen. This corresponds to about 70.6 percent of acrylonitrile. The product had an inherent viscosity of 0.52 in dimethylformamide at 25° C at a concentration of 0.5 grams per 100 ml solution. About 50 grams of the product was fused by mixing in a Brabender Plastograph for 3 minutes at 161°-176° C. The product showed excellent melt strength. It was molded at 177° C to form a colorless, translucent 6 inch × 3 inch × ⅛ inch plate. The product was stiff and strong. Notched Izod impact was only 0.2 ft/lbs per inch of notch and the tensile impact was 13 ft/lbs per square inch.

EXAMPLE VII

The product of Example VI was milled to a sheet at a temperature of 165° C. The sheet was chopped with a granulator to pellets about ⅛ inch in diameter which were used to blow mold 16 oz. bottles. The bottles were opaque and stiff and broke easily when hit with a hard object.

EXAMPLE VIII

In a stainless steel 200 gal. autoclave equipped as described in Example III, were placed 444 liters of water followed by a solution of 422 grams of monosodium phosphate monohydrate and 1.70 kg of sodium laurylsulfate in 40.8 liters of water. Mechanical agitation was started and 30.8 kg of FRS-2004 (a 60 percent aqueous polybutadiene latex manufactured by Firestone Corp.) was added slowly. The mixture had at this point a pH of 6.8. Added were 25 grams of Antifoam 66 (a silicone-type antifoam supplied by General Electric Co.). Air in the autoclave was removed as described in Example III and a solution consisting of 102.0 kg acrylonitrile, 34.0 kg methyl acrylate and 4.35 liters of n-dodecylthiol was added, followed by the addition of a solution of 2.38 kg sodium laurylsulfate in 10 liters of water. The mixture was heated to 60° C and held at this temperature. Polymerization was initiated by the addition of 81 grams ammonium persulfate in 1 liter of water. After 3-¾ hours heat evolution was practically over and a solution of 40 grams sodium dimethyldithiocarbomate in 1 liter of water was added. Unreacted volatile materials were removed by vacuum stripping the reaction mixture at 68° C for 3 hours. The reaction mixture was cooled and then passed through a 12 mesh screen where 13.6 kg of wet by-product were recovered. This by-product contained 52.2 percent solids (equivalent to 7.1 kg). These solids, in turn, contained 24.4 percent acrylonitrile. By calculation it was shown that 4.8 kg of the polybutadiene were in the by-product.

The filtrate which contained the product in the form of a latex occupied a volume of 652 liters and contained 20.8 percent solids. The product was recovered from the latex by adding 1 part of latex slowly to 3 parts of vigorously agitated 1.0 percent aqueous calcium chloride solution at a temperature of 69°-70° C throughout the addition. The product was recovered by filtration, washed well in the water, and dried. The product contained 64.6 percent of acrylonitrile. Fifty grams of the product were fused by mixing for 3 minutes in a Brabender Plastogaph at a temperature of 161°–188.5° C. The product exhibited excellent melt strength and was molded at 177° C to a transparent 6 inch × 3 inch × ⅛ inch plate which had the following physical properties:

| Tensile yield | 8840 psi |
|---|---|
| Tensile break | 7030 psi |
| Elongation at break | 25% |
| Tensile modulus | 558,000 psi |
| Notched Izod impact | 1.1 ft/lb per in. of notch |
| Deflection temp. at 264 psi | 65° C |

A small part of the plate was fused and pressed into thin film. Permeability to oxygen of this film was measured and found to be below 0.5 cm$^3$/ml/100 in$^2$/24 hrs. at 1 atm. and 23° C. Bottles were blow molded as described in Example V. The bottles were transparent and of adequate stiffness for filling with liquids. They did not break when hit with a hard object. The bottles were substantially impermeable to a wide variety of gases and vapors.

EXAMPLE IX

The procedure chosen was that described in Example IV-A of German patent specification No. 1,957,324. In a stainless steel, 3 liter autoclave a polybutadiene latex was prepared by polymerization at 42° C under continuous agitation under substantial absence of oxygen of the following ingredients:

| 1,3-Butadiene | 800 g (100 parts) |
|---|---|
| ORR-soap* | 11.2 g (1.4 parts) |
| Potassium persulfate | 1.84 g (0.23 parts) |
| Tert-dodecylmercaptan | 3.2 g (0.4 parts) |
| Water | 1600 g (200 parts) |

*Predominantly sodium salts of straight chain aliphatic carboxylic acids having 14 to 18 carbon atoms in the chain.

When butadiene conversion was 67 percent the reaction was terminated by cooling and venting of the unreacted butadiene. The resulting latex had a solids content of 25.2 percent.

EXAMPLE X

The procedure chosen was that described in Example IV-A of German patent specification No. 1,957,324. The reaction mixture consisted of the following ingredients:

| Methacrylonitrile | 427.5 g (95 parts) |
|---|---|
| Methyl methacrylate | 22.5 g (5 parts) |
| Latex of Example IX | 446 g (25 parts dry polybutadiene) |
| Tert-butylperoxypivalate | 2.25 g (0.5 parts) |
| GAFAC RE-610* | 13.5 g (3.0 parts) |
| n-Dodecylmercaptan | 2.25 g (0.5 parts) |
| Ethylenediaminotetraacetic acid | 0.23 g (0.05 parts) |
| Potassium hydroxide | 1.0 g |
| Water | 1012 g (225 parts) |

*Mixture of R—O—(CH$_2$CH$_2$O—)$_n$PO$_3$M$_2$ and [R—O—(CH$_2$CH$_2$O—)$_n$]$_2$—PO$_2$M wherein n is 1 to 40, R is an alkyl or alkaryl group and preferably a nonylphenyl group, and M is hydrogen, the ammonium cation or an alkali metal cation (a commercial product of the American General Aniline and Film Corp.).

The latex of Example IX was added slowly to the stirred partially neutralized aqueous solution of GAFAC RE-610 and ethylenediaminotetraacetic acid. Air was removed and methacrylonitrile, methyl methacrylate and n-dodecylmercaptan were added. The mixture was stirred at 60° C in a nitrogen atmosphere. Polymerization was initiated by the addition of tert-butylperoxypivalate and allowed to proceed for 20 hours. After this time the reaction mixture showed 28.3 percent solids, which corresponded to a monomers conversion of 93 percent.

The product was coagulated by adding the product slowly to 6,000 ml of a stirred dilute aqueous aluminum sulfate solution at a temperature of 65° C. The product was separated by filtration, thoroughly washed with water, and dried overnight at 45° C. Thorough dryness of the product was assured by drying it overnight at 50° C and 1 mm Hg pressure. Fifty-two grams of the product were mixed in the Brabender Plastograph for 3-½ minutes at a temperature of 217°–232° C. Melt strength of the material was very poor. It was molded at 188° C to a transparent, but very hazy, 6 inch × 3 inch × ⅛ inch plate. After standing for 2 days at room temperature the plate lost its transparency and became translucent. Physical properties were as follows:

| Tensile yield | 1840 psi |
|---|---|
| Tensile break | 1840 psi |
| Elongation at break | 1% |
| Tensile modulus | 337,000 psi |
| Notched Izod impact | 1.0 ft/lbs per in. of notch |
| Deflection temp. at 264 psi | 91° C |

EXAMPLE XI

Example X was repeated using the following ingredients:

| Acrylonitrile | 337.5 g (75 parts) |
|---|---|
| Methyl acrylate | 112.5 g (25 parts) |
| Latex of Example X | 446.0 g (25 parts dry poly butadiene) |
| Potassium persulfate | 0.27 g (0.06 parts) |
| GAFAC RE-610* | 13.5 g (3.0 parts) |
| n-Dodecylmercaptan | 2.25 g (0.5 parts) |
| Ethylenediaminotetraacetic acid | 0.23 g (0.05 parts) |
| Water | 1012 g (225 parts) |

*Mixture of R—O—(CH$_2$CH$_2$O—)$_n$PO$_3$M$_2$ and [R—O—(CH$_2$CH$_2$O—)$_n$]$_2$—PO$_2$M wherein n is 1 to 40, R is an alkyl or alkaryl group and preferably a nonylphenyl group, and M is hydrogen, the ammonium cation or an alkali metal cation (a commercial product of the American General Aniline and Film Corp.).

Polymerization was carried out at 60° C for 20 hours in a nitrogen atmosphere. The product was coagulated at 60° C by adding the latex to a stirred solution of 8.0 grams Al$_2$(SO$_4$)$_3$·18 H$_2$O in 4 liters of water. The product was separated by filtration, washed with water, and dried in an oven at atmospheric pressure. It contained 54.5 percent acrylonitrile.

Fifty-two grams of the product were mixed in a No. 6 head of the Brabender Plastograph for 3 minutes at 35 rpm. Temperature of the heat exchange fluid circulating through the head was set at 230° C. The material exhibited poor melt strength. The material was molded at 182° C to a transparent 6 inch × 3 inch × ⅛ inch plate which was extremely hazy. Physical properties were as follows:

| Tensile yield | 1630 psi |
|---|---|
| Tensile break | 1630 psi |
| Elongation at break | 1% |
| Tensile modulus | 408,000 psi |
| Deflection temp. at 264 psi | 63° C |

Examples I through IV show the preparation of polymers of the invention. Examples I, II and IV are within the preferred range of the invention. Polymers prepared in these examples showed good impact strength which ranged from 0.7 ft/lbs per inch of notch in Example IV to 2.6 ft/lbs per inch of notch in Example I. The amount of polybutadiene used per 100 parts of monomers ranged from 9.0 parts in Example IV to 14.6 parts in Example I.

Example III is outside the preferred range, since only 6.3 parts of polybutadiene per 100 parts of monomers were used. In this example the Izod impact was 0.6 ft/lbs per inch of notch and the tensile impact 24 ft/lbs per square inch.

Example VI is outside the scope of the present invention. In this example the same monomers in the same ratios were used as in Examples I through IV, but polybutadiene was left out. The strength of the polymer of Example VI was excellent, but impact was poor. Notched Izod impact was only 0.2 ft/lbs per inch of notch and tensile impact was only 13 ft/lbs per square inch.

Examples V and VIII show that bottles prepared from the polymer of the present invention have good toughness as well as strength and are not likely to break under conditions of daily usage. Example VII shows that bottles prepared from polymer of Example VI, which is outside the present invention, are too brittle to withstand conditions likely to be encountered in daily usage.

When the amounts of polybutadiene are greater than those specified in the present invention, the strength of the polymer material is greatly reduced and the melt strength is poor, as is shown in Examples X and XI. The polymeric material of Example XI was prepared with the same monomers in the same ratio to each other as Examples I through IV, but using 25 parts of polybutadiene per 100 parts of monomers. Example X was prepared exactly according to the teaching of the prior art using also 25 parts of polybutadiene per 100 parts of monomers. In Examples X and XI the tensile yields were 1,840 and 1,630 psi, and the melt strengths were poor. The polymeric materials of the present invention as described in Examples I, II, IV and VII showed tensile yields of 8,020 to 9,780 psi and excellent melt strengths. It will be obvious to those skilled in the art that polymers with a high tensile yield and a good melt strength such as those prepared by the process of the present invention will be more suitable for the manufacture of a great number of articles, such as bottles, tubes, jars, pipe, film, motor housing, house-sidings, etc., than the low tensile polymers prepared according to prior art with more polybutadiene than disclosed in the present invention.

What we claim is:

1. A process for the production of impact resistant polymers having low permeability to gases and vapors comprising polymerizing at a temperature of from about 0°–100° C in aqueous medium in the presence of an emulsifier and a free radical polymerization initiator in the substantial absence of molecular oxygen, 100 parts by weight of
    A. at least 50 percent by weight of a compound having the structure

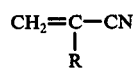

wherein R is a member selected from the group consisting of hydrogen and a lower alkyl group having from 1 to 4 carbon atoms, and
    B. up to about 50 percent by weight based on the combined weight of (A) and (B) of an ester having the structure

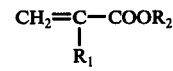

wherein $R_1$ is a member selected from the group consisting of hydrogen and an alkyl group having from 1 to 4 carbon atoms and $R_2$ is an alkyl group having from 1 to 6 carbon atoms,
    in the presence of from 8 to 15 parts by weight of
    C. a homopolymer of a conjugated diene monomer selected from the group consisting of butadiene and isoprene.

2. The process of claim 1 wherein (A) is acrylonitrile.
3. The process of claim 1 wherein (A) is methacrylonitrile.
4. The process of claim 1 wherein (B) is methylacrylate.
5. The process of claim 1 wherein (B) is ethylacrylate.
6. The process of claim 1 wherein (B) is methyl methacrylate.
7. The process of claim 1 wherein (C) is butadiene.
8. A process for the production of strong, impact-resistant polymers moldable into transparent articles having low haze and low permeability to gases and vapors which comprises polymerizing at a temperature of from about 0° to about 100° C in aqueous medium in the presence of an emulsifier and a free radical polymerization initiator in the substantial absence of molecular oxygen, 100 parts by weight of a mixture of
    A. acrylonitrile, and
    B. methyl acrylate, from 60 to 90 percent of the mixture being acrylonitrile,
    in the presence of 8 to 15 parts by weight of a rubbery homopolymer of butadiene-1,3 in the form of an emulsion.

9. A thermoplastic polymeric composition resulting from the polymerization in aqueous medium of 100 parts by weight of
    A. at least 50 percent by weight of a compound having the structure

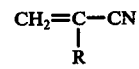

wherein R is selected from the group consisting of hydrogen and an alkyl group having from 1 to 4 carbon atoms, and
    B. up to about 50 percent by weight based on the combined weight of (A) and (B) of an ester having the structure

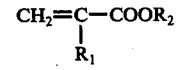

wherein $R_1$ is a member selected from the group consisting of hydrogen and an alkyl group having from 1 to 4 carbon atoms and wherein $R_2$ is an alkyl group having 1 to 6 carbon atoms, in the presence of from 8 to 15 parts by weight of
  C. a homopolymer of a conjugated diene monomer selected from the group consisting of butadiene and isoprene.

10. The composition of claim 9 wherein (A) is methacrylonitrile.

11. The composition of claim 9 wherein (A) is acrylonitrile.

12. The composition of claim 9 wherein (B) is methyl acrylate.

13. The composition of claim 9 wherein (B) is ethyl acrylate.

14. The composition of claim 9 wherein (B) is methyl methacrylate.

15. A bottle produced from the composition of claim 9.

16. The thermoplastic polymeric composition resulting from the polymerization in aqueous medium of about 100 parts by weight of a mixture of
  A. from 60 to 90 percent by weight of acrylonitrile, and
  B. from 40 to 10 percent by weight of methyl acrylate, in the presence of from 8 to 15 parts by weight of polybutadiene.

* * * * *

UNITED STATES PATENT OFFICE
CERTIFICATE OF CORRECTION

PATENT NO. : 4,038,344
DATED : July 26, 1977
INVENTOR(S) : Allan A. Eisenbraun & Edwin D. Hornbaker It is certified that error appears in the above-identified patent and that said Letters Patent are hereby corrected as shown below:

Column 2, line 66, "present" should read -- presence --
Column 3, line 50, "CH=C-CN" should read -- $CH_2$=C-CN --.
Column 5, line 52, "of a 5 grams" should read -- of 5 grams --.
Column 9, line 4, "Plastogaph" should read -- Plastograph --.
Column 9, line 61, "[R-O-$(CH_2CH_2O-)_n]_2$" should read -- [R-O-$(CH_2CH_2O-)_n]_2$ --. Column 11, line 44, "VII" should read -- VIII --.

Signed and Sealed this

Fourth Day of July 1978

[SEAL]

Attest:

RUTH C. MASON
Attesting Officer

DONALD W. BANNER
Commissioner of Patents and Trademarks